(12) United States Patent
Chien

(10) Patent No.: US 8,794,814 B2
(45) Date of Patent: Aug. 5, 2014

(54) FOAMING MATERIAL FRAME AND DISPLAY STRUCTURE USING THE SAME

(75) Inventor: Yuan-Yu Chien, Hsin-Chu (TW)

(73) Assignee: AU Optronics Corp., Hsichu (TW)

( * ) Notice: Subject to any disclaimer, the term of this patent is extended or adjusted under 35 U.S.C. 154(b) by 209 days.

(21) Appl. No.: 13/443,224

(22) Filed: Apr. 10, 2012

(65) Prior Publication Data

US 2013/0128616 A1 May 23, 2013

(30) Foreign Application Priority Data

Nov. 18, 2011 (TW) .............................. 100142370 A

(51) Int. Cl.
*F21V 7/04* (2006.01)
*G09F 9/00* (2006.01)
*G02F 1/1335* (2006.01)

(52) U.S. Cl.
CPC ............ *G09F 9/00* (2013.01); *G02F 1/133615* (2013.01); *F21V 7/04* (2013.01); *G02F 1/133608* (2013.01)
USPC ......................................................... 362/633

(58) Field of Classification Search
CPC ................ F21V 7/04; G02F 1/133615; G02F 1/133608; G02F 1/133602; G02B 6/009; G02B 6/0001; G02B 6/0031
See application file for complete search history.

(56) References Cited

U.S. PATENT DOCUMENTS

| | | | | |
|---|---|---|---|---|
| 7,505,093 B2 * | 3/2009 | Yeom | ............................... | 349/64 |
| 8,269,920 B2 * | 9/2012 | Lee et al. | ........................ | 349/69 |
| 8,622,600 B2 * | 1/2014 | Cheng et al. | .................. | 362/608 |
| 2004/0169788 A1 * | 9/2004 | Park | ............................... | 349/65 |
| 2005/0073626 A1 * | 4/2005 | Yeom | ............................... | 349/64 |
| 2007/0229995 A1 | 10/2007 | Kawato et al. | | |
| 2010/0073599 A1 * | 3/2010 | Yoon et al. | ...................... | 349/64 |
| 2010/0302478 A1 * | 12/2010 | Nakagawa et al. | ............. | 349/62 |
| 2011/0255026 A1 * | 10/2011 | Pan et al. | ........................ | 349/61 |

FOREIGN PATENT DOCUMENTS

| CN | 101067693 A | 11/2007 |
|---|---|---|
| TW | M331123 | 8/2007 |
| TW | 200811531 | 3/2008 |
| TW | 200848847 A | 12/2008 |

* cited by examiner

*Primary Examiner* — Bao Q Truong
(74) *Attorney, Agent, or Firm* — WPAT, PC; Justin King

(57) ABSTRACT

A foaming material frame is provided and can be utilized in a display structure. The foaming material frame includes a base plate and a sidewall. The base plate includes a loading portion and a suppressing portion connected to at least one side of the loading portion. A reflectance of the suppressing portion is smaller than a reflectance of the loading portion. An area of the loading portion is equal to or greater than a display zone of the display structure. The sidewall stands upright around the base plate. A display structure using the foaming material frame is also provided.

8 Claims, 4 Drawing Sheets

US 8,794,814 B2

FOAMING MATERIAL FRAME AND DISPLAY STRUCTURE USING THE SAME

RELATED APPLICATIONS

This application claims priority to Taiwan Application Serial Number 100142370, filed Nov. 18, 2011, which is herein incorporated by reference.

BACKGROUND

1. Field of Invention

The present invention relates to a display structure. More particularly, the present invention relates to display structure using a foaming material frame.

2. Description of Related Art

A flat display mainly includes a backlight module, a display panel, and a frame. The backlight module is utilized for providing a light source to enable the display panel to display a normal and uniform image. The backlight module includes plural optical sheets, such as a light guide plate, a diffusion sheet, and a prism sheet for uniformly distributing the light emitted from the light source on the display panel to provide images. The frame includes a metal holder and a plastic frame for fastening the display panel and the backlight module.

The development trend of the current electron products is towards lightness and thinness, and the design of the flat display is also developed towards lightness and a narrow width frame. Therefore there is a need to provide a thin and light flat display without sacrificing the display quality thereof.

SUMMARY

The present invention provides a foaming material frame utilized in a display structure for satisfying the requirements of lightness and a narrow width frame.

One aspect of the invention is to provide a foaming material frame utilized in a display structure. The foaming material frame includes a base plate and a sidewall. The base plate includes a loading portion and a suppressing portion connected to at least one side of the loading portion. A reflectance of the suppressing portion is smaller than a reflectance of the loading portion, and an area of the loading portion is equal to or greater than an area of a display zone of the display structure. The sidewall stands upright around the substrate. A thickness of the suppressing portion is smaller than a thickness of the loading portion. A height difference between the suppressing portion and the loading portion is at least 0.2 mm.

Another aspect of the invention is to provide a display structure. The display structure includes a foaming material frame, a light guide plate, and a display panel. The foaming material frame includes a base plate and a sidewall. The base plate includes a loading portion and a suppressing portion connected to at least one side of the loading portion. A reflectance of the suppressing portion is less than a reflectance of the loading portion, and an area of the loading portion is equal to or greater than an area of a display zone of the display structure. The sidewall stands upright around the base plate. The light guide plate is disposed on the loading portion. The display panel is disposed on the foaming frame. The display panel has a display zone, and the area of the loading portion is equal to or greater than the area of the display zone. A thickness of the suppressing portion is less than a thickness of the loading portion. A height difference between the suppressing portion and the loading portion is at least 0.2 mm. The display structure further includes a light source disposed at a side of the light guide plate. The suppressing portion is disposed at another side of the light guide plate opposite to the light source. The suppressing portion is disposed at sides of the light guide plate adjacent to the light source. An air layer is formed between the light guide plate and the suppressing portion. The sidewall has a supporting portion, and the display panel is placed on the supporting portion.

The requirements of lightness and a narrow width frame of the display structure can be satisfied by using the foaming material frame to replace the conventional metal holder and plastic material thereon. The problem of light leakage due to omitting the light shielding structure can be solved by reducing the thickness of the suppressing portion, such that a reflectance of the suppressing portion is smaller than a reflectance of the loading portion.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
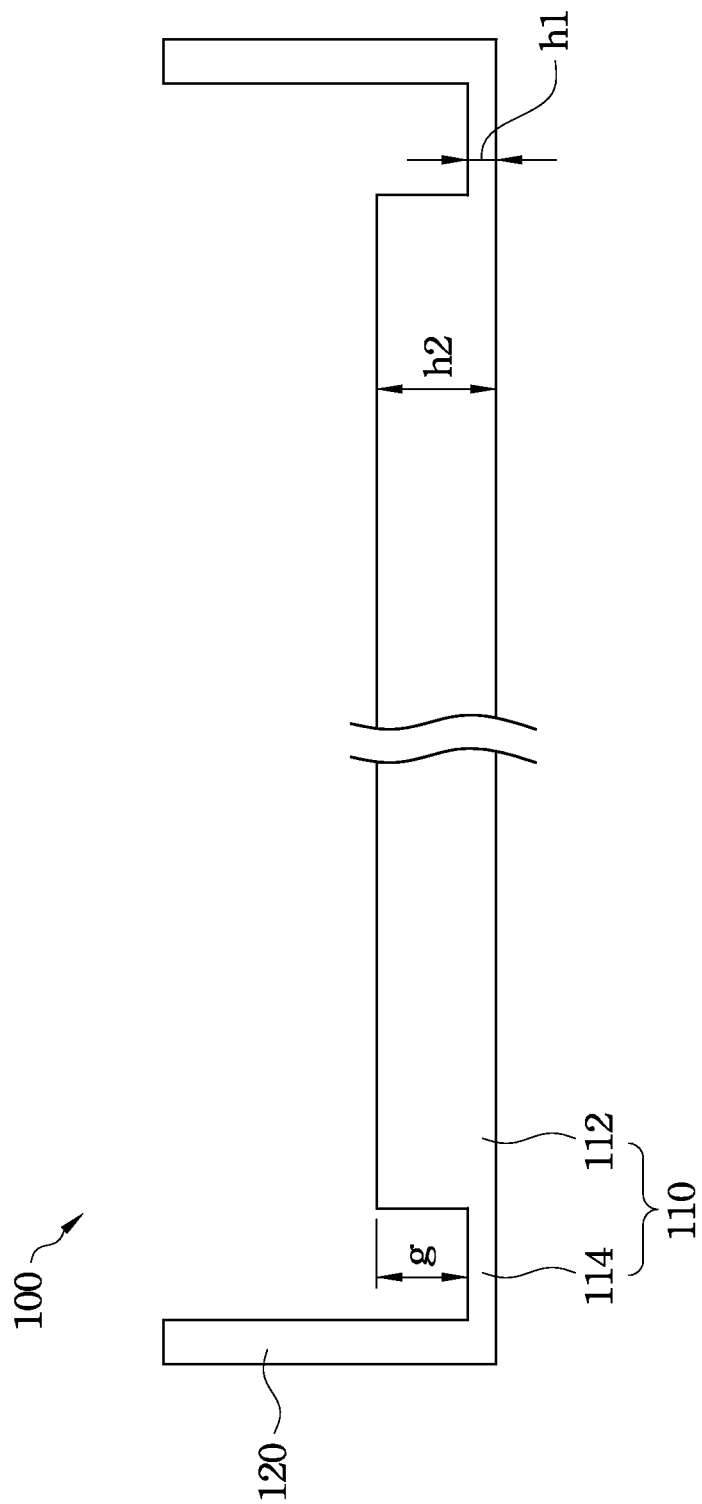
FIG. 1 is a cross-sectional view of a foaming material frame according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

For satisfying the requirements of lightness and a narrow width frame of a flat display, a foaming material frame is utilized as the frame of the backlight module for omitting a conventional plastic frame including a back plate and a plastic material thereon to satisfy the requirements of thinness. However, in such a design, since the light shielding structure above the light guide plate (such as the plastic material) is omitted, and the total size of the light guide plate and optical sheets is similar to the size of the frame of the foaming material frame, the problem of light leakage at the edge of the display zone occurs, thus resulting in poor product yield.

FIG. 1 is a cross-sectional view of a foaming material frame 100 according to an embodiment of the invention. The foaming material frame 100 is utilized in a display structure. The foaming material frame 100 includes a base plate 110 and a sidewall 120. The base plate 110 includes a loading portion 112, and a suppressing portion 114 connected to at least one side of the loading portion 112. The sidewall 120 stands upright and surrounds an edge of the base plate 110. The foaming material frame 100 is compressed formed. The base plate 110 and the sidewall 120 are one-piece formed. The bottom surfaces of the loading portion 112 and the suppressing portion 114 are co-planar.

Figure 2:
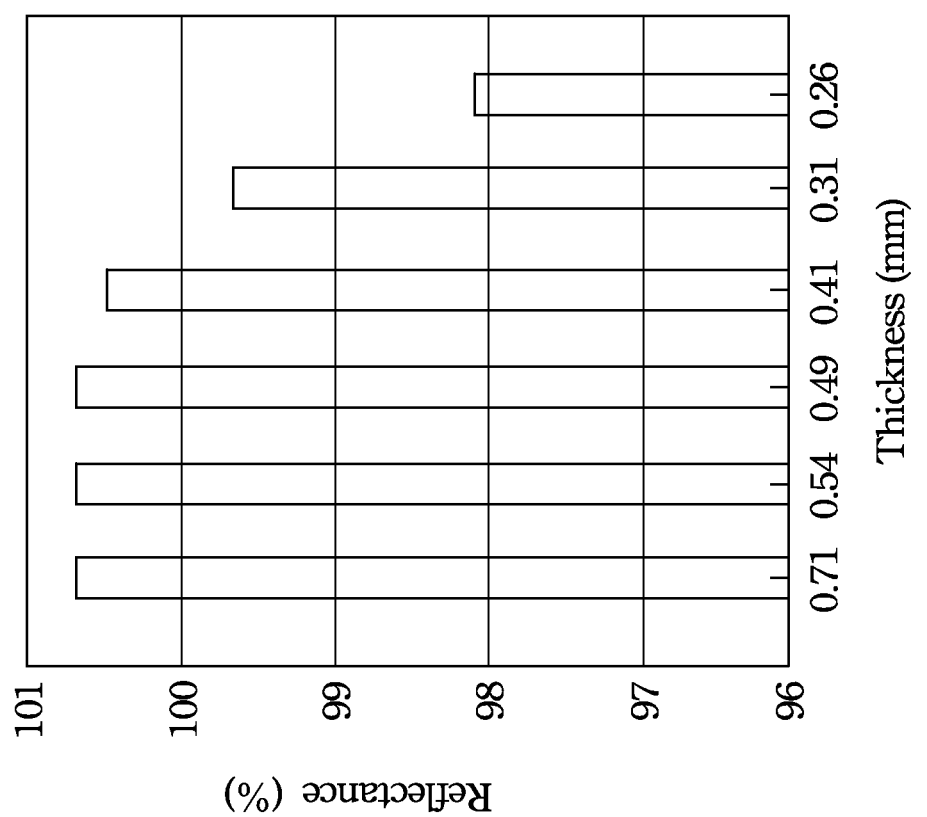
FIG. 2 is a graph of the relationship between thickness and reflectance of the foaming material.

Further, referring to FIG. 2. FIG. 2 is a graph of the relationship between thickness and reflectance of the foaming material. In the same foaming material plate, the reflectance of the foaming material plate is related to the thickness thereof. More particularly, the thinner the thickness of the foaming material plate is, the lower reflectance the foaming material plate has. Therefore, the foaming material frame 100 of the present invention can modify the reflectance by adjusting the thickness thereof.

Please refer back to FIG. 1. The loading portion 112 is utilized for supporting, for example, a light guide plate in the display structure. An area of the loading portion 112 is equal to or greater than an area of a display zone of the display structure. For preventing the light leakage due to high reflectance of the foaming material at the edge of the display zone, the reflectance of the suppressing portion 114, which surrounds the loading portion 112 and the display zone, should be smaller than the reflectance of the loading portion 112. Namely, the thickness h1 of the suppressing portion 114 is smaller than the thickness h2 of the loading portion 112. In one embodiment, the light leakage problem can be overcome when a height difference between the suppressing portion 114 and the loading portion 112 is at least 0.2 mm.

Figure 3:
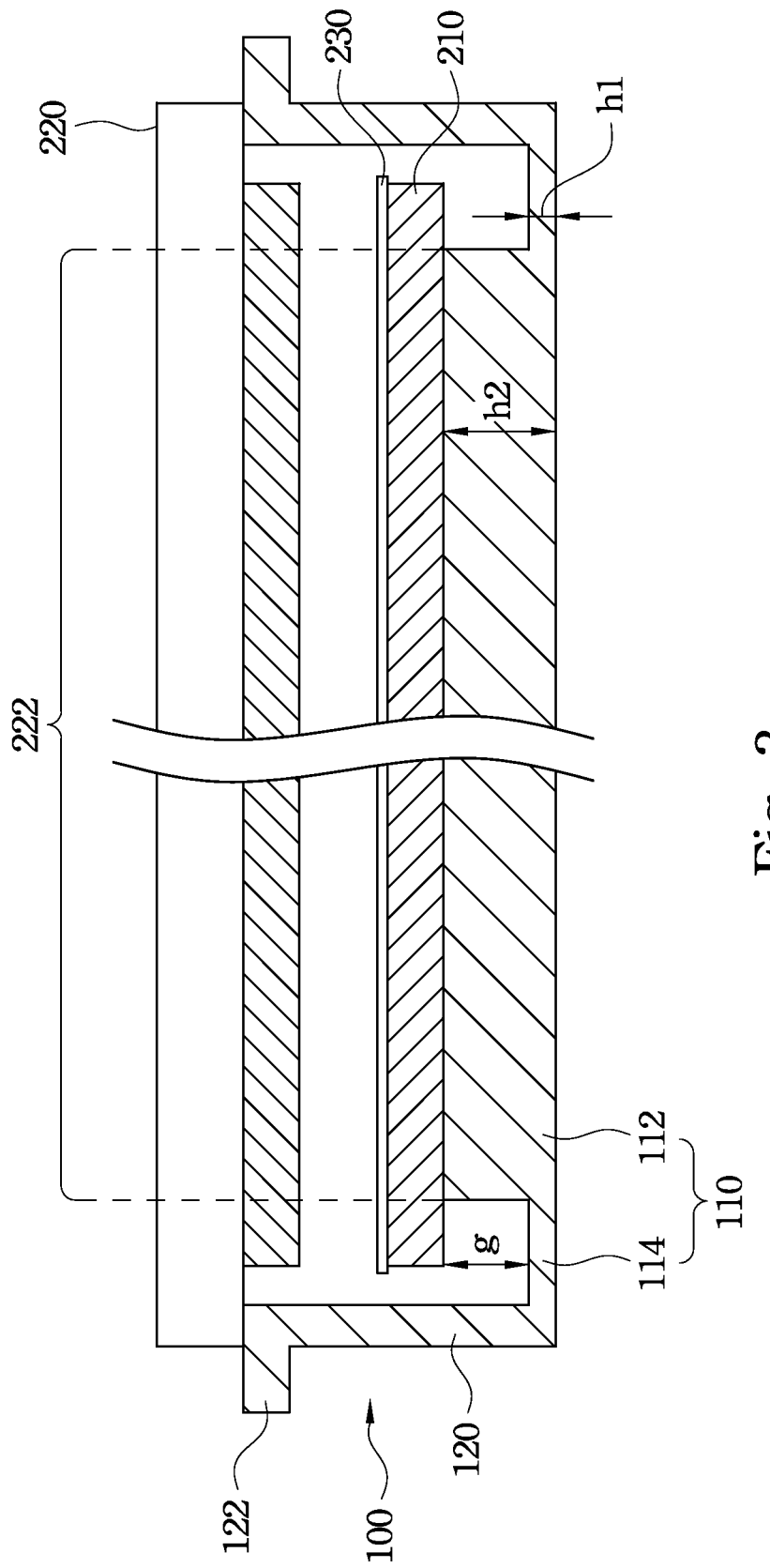
FIG. 3 is a cross-sectional view of a display structure utilizing the foaming material frame according to an embodiment of the invention.

FIG. 3 is a cross-sectional view of a display structure utilizing the foaming material frame according to an embodiment of the invention. The display structure 200 includes the foaming frame 100, a light guide plate 210, and a display panel 220. The foaming frame 100 includes the base plate 110 and the sidewall 120. The base plate 110 includes the loading portion 112 and the suppressing portion 114. The sidewall 120 stands upright on and surrounds the edge of the base plate 110. The light guide plate 210 is disposed on the loading portion 112, and the display panel 220 is disposed on the foaming material frame 100.

The display panel 220 has a display zone 222. The area of the loading portion 112 is equal to or greater than the area of the display zone 222. An optical sheet 230 can be further disposed on the light guide plate 210. The sidewall 120 of the foaming material frame 100 further includes a supporting portion 122, and the display panel 220 is placed on the supporting portion 122. In order to solve the problem of light leakage, the thickness h1 of the suppressing portion 114 is smaller than the thickness h2 of the loading portion 112, such that the reflectance of the suppressing portion 114 is smaller than the reflectance of the loading portion 112. There is a height difference g between the suppressing portion 114 and the loading portion 112. The height difference g is at least 0.2 mm. An air layer is formed between the light guide plate 210 and the suppressing portion 114.

Figure 4:
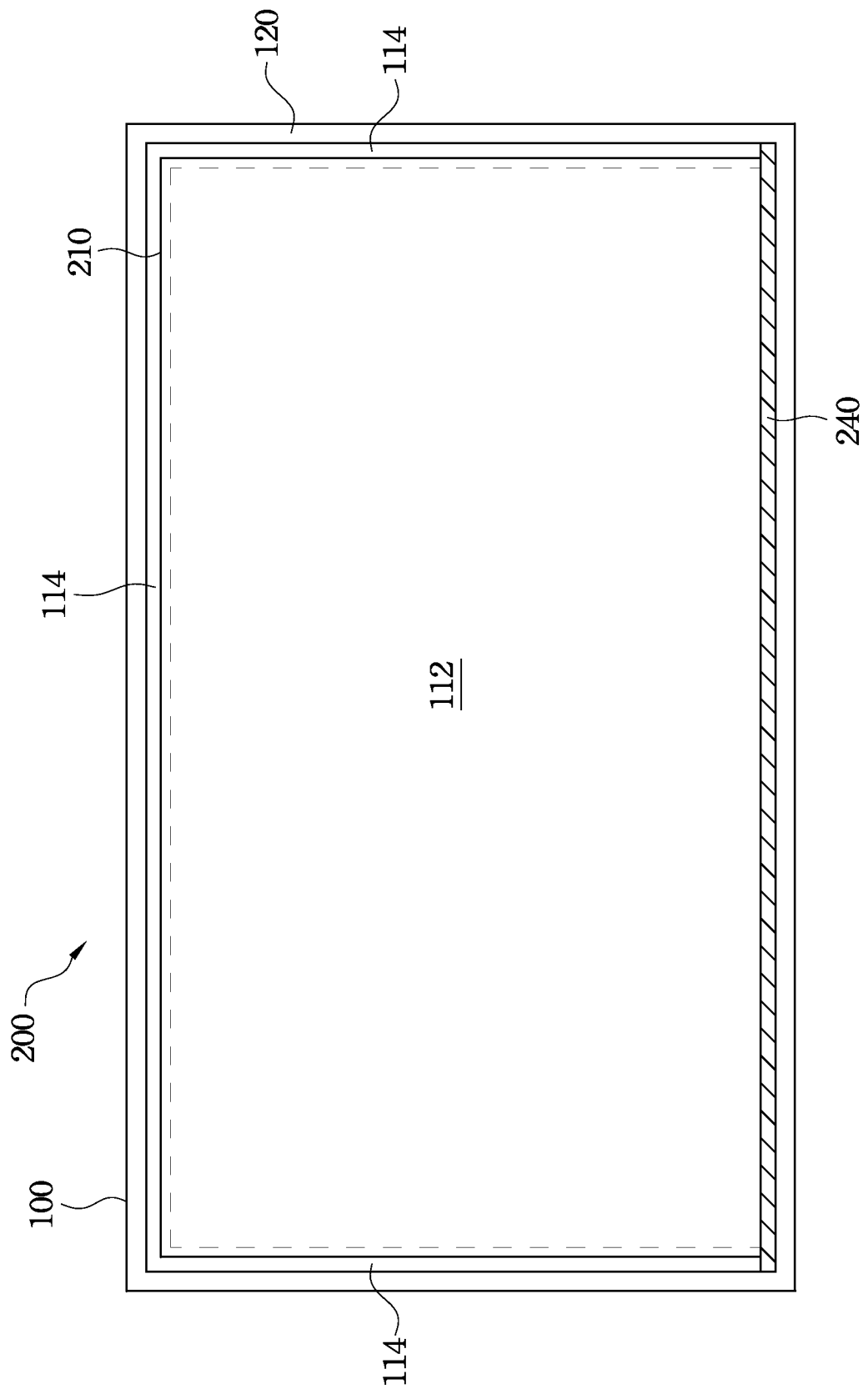
FIG. 4 is a top view of the foaming material frame and the light guide plate of the display structure in FIG. 3.

Please refer to FIG. 3 and FIG. 4 simultaneously. FIG. 4 is a top view of the foaming material frame 100 and the light guide plate 210 of the display structure 200 in FIG. 3. The area of the loading portion 112 is corresponding to the area of the display zone 222 of the display panel 220. The light guide plate 210 is placed on the loading portion 112. The loading portion 112 is connected to the sidewall 120 by the suppressing portion 114. The display structure 200 further includes a light source 240. The light source 240 is disposed at one side of the light guide plate 210. The suppressing portion 114 is disposed at opposite side to the light source 240. The suppressing portion 114 is disposed at sides of the light guide plate 210 adjacent sides to the light source 240. Namely, the base plate 110 of the foaming material frame 100 corresponding the area outside the display zone 222 (except the side of the light guide plate 210 next to the light source 240) is compressed and becomes the suppressing portion 114 in order to reduce the thickness and the reflectance of the suppressing portion 114, thereby overcoming the problem of light leakage at the edge of the display zone 222.

The requirement of being lighter and having narrow side-frame of the display structure can be satisfied by using the foaming material frame to replace the conventional metal holder and plastic material thereon. The problem of light leakage due to omitting the light shielding structure can be solved by reducing the thickness of the suppressing portion, such that the reflectance of the suppressing portion is smaller than the reflectance of the loading portion.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A foaming material frame utilized in a display structure, the foaming material frame comprising:
    a base plate comprising a loading portion and a suppressing portion connected to at least one side of the loading portion, wherein a reflectance of the suppressing portion is smaller than a reflectance of the loading portion, a thickness of the suppressing portion is smaller than a thickness of the loading portion, and an area of the loading portion is equal to or greater than an area of a display zone of the display structure; and
    a sidewall standing around the base plate.

2. The foaming material frame of claim 1, wherein a height difference between the suppressing portion and the loading portion is at least 0.2 mm.

3. A display structure comprising:
    a foaming material frame comprising:
        a base plate comprising a loading portion and a suppressing portion connected to at least one side of the loading portion, wherein a reflectance of the suppressing portion is smaller than a reflectance of the loading portion, and a thickness of the suppressing portion is smaller than a thickness of the loading portion; and
        a sidewall standing upright around the base plate;
    a light guide plate disposed on the loading portion; and
    a display panel disposed on the foaming frame, the display panel having a display zone, wherein an area of the loading portion is equal to or greater than an area of the display zone.

4. The display structure of claim 3, wherein a height difference between the suppressing portion and the loading portion is at least 0.2 mm.

5. The display structure of claim 3, further comprising a light source disposed at a side of the light guide plate, wherein the suppressing portion is disposed at another side of the light guide plate to the light source.

6. The display structure of claim 3, further comprising a light source, wherein the suppressing portion is disposed at sides of the light guide plate adjacent to of the light source.

7. The display structure of claim 3, wherein an air layer is formed between the light guide plate and the suppressing portion.

8. The display structure of claim 3, wherein the sidewall has a supporting portion, and the display panel is placed on the supporting portion.

\* \* \* \* \*